Nov. 25, 1969     J. J. FESCO     3,479,802
MULTI-COMPARTMENT VACUUM CLEANER FILTER BAG
Filed Feb. 23, 1965     2 Sheets-Sheet 1
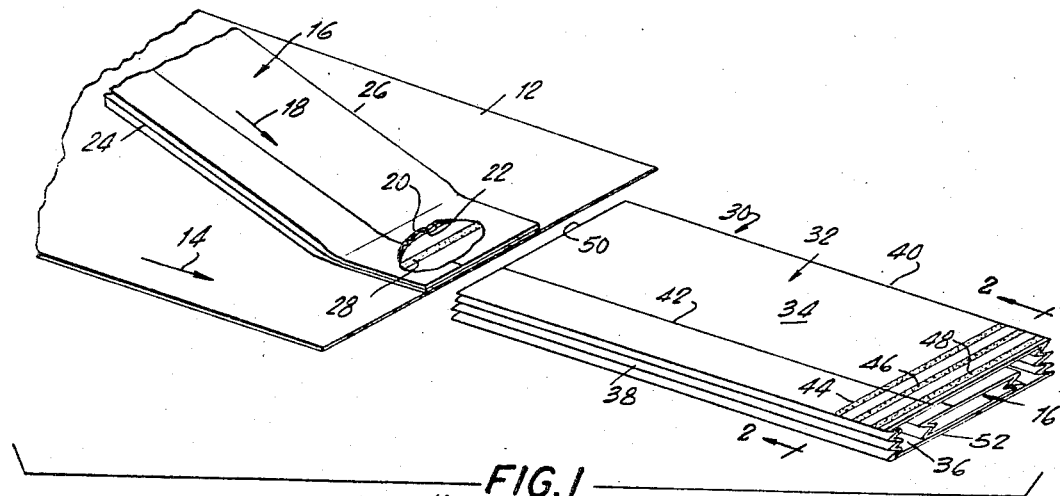
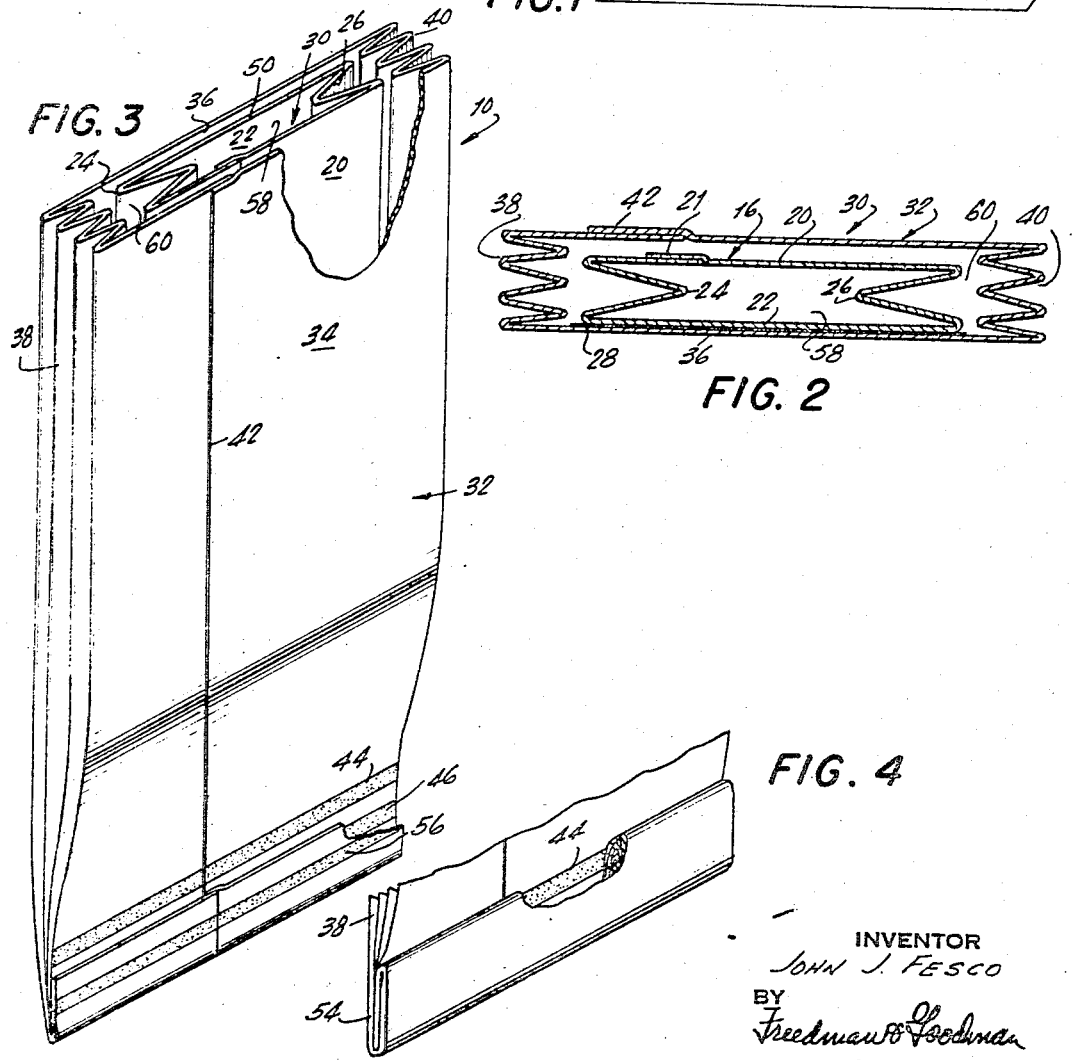
INVENTOR
JOHN J. FESCO
BY
Freedman & Freedman
ATTORNEYS

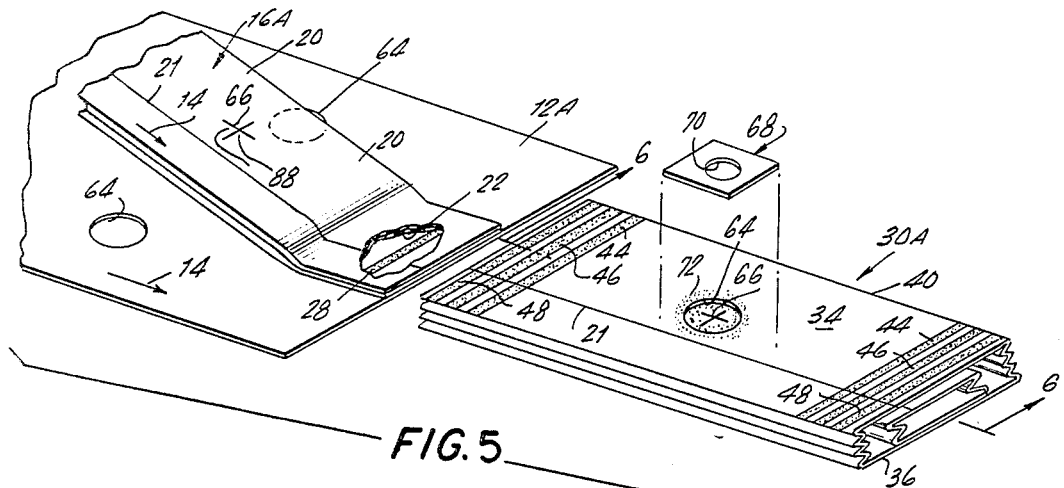
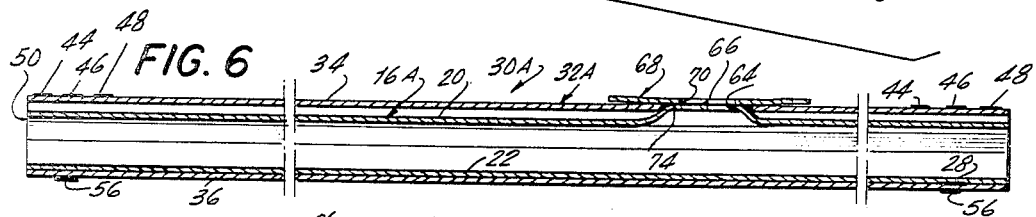
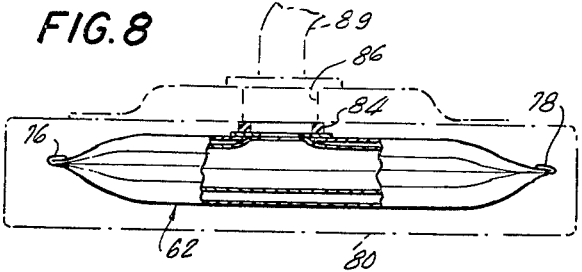
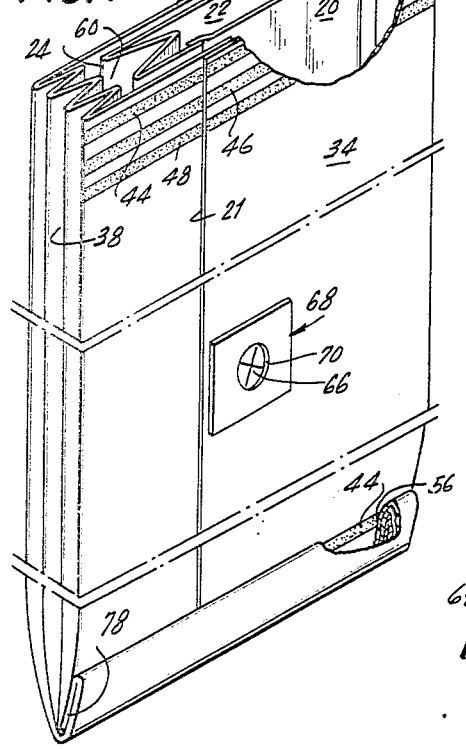
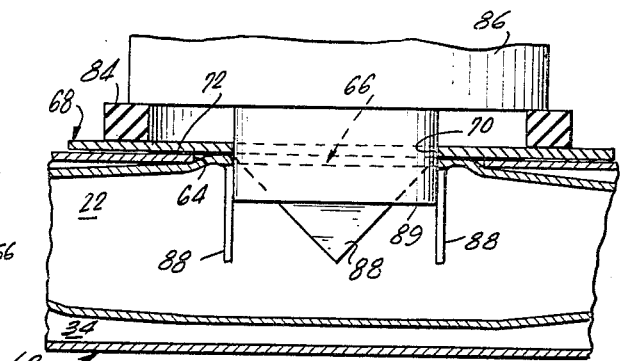
INVENTOR
JOHN J. FESCO
BY
ATTORNEYS

United States Patent Office 3,479,802
Patented Nov. 25, 1969

3,479,802
MULTI-COMPARTMENT VACUUM CLEANER FILTER BAG
John J. Fesco, Baldwin, N.Y., assignor to Studley Paper Company, Inc., a corporation of New York
Filed Feb. 23, 1965, Ser. No. 434,600
Int. Cl. B01d 46/02, 29/12
U.S. Cl. 55—367                           2 Claims

ABSTRACT OF THE DISCLOSURE

A multi-compartment vacuum cleaner bag formed of an air permeable material comprising inner and outer tubes formed with gussetted end walls, the ends of the tubes being sealed and an aperture and collar arrangement wherein a seal is formed so that the dust laden air initially enters the inner tube and passes therethrough in to the outer tube and thence into the atmosphere in filtered form.

---

The present invention relates in general to bags and in particular to bags having a multi-wall or multi-compartment construction.

It is an object of the present invention to provide a highly novel construction for a multi-wall or multi-compartmented bag.

It is another object of the present invention to provide a highly novel bag construction which is eminently suitable for general storage purposes.

It is a further object of the present invention to provide a highly novel bag which is eminently suitable for utilization as in a vacuum cleaner filter bag.

In conformance with the foregoing object of the present invention, it is a still further object of the present invention to provide a highly novel multi-wall or multi-compartmented vacuum cleaner filter bag which is eminently suitable to provide a maximum filtration function when used within a vacuum cleaner.

Other and further objects and advantages of the present invention will become readily apparent to one skilled in the art from a consideration of the following specification taken in connection with the appended drawings.

In the appended drawings, which best illustrate the best modes presently contemplated for carrying out the invention:

FIGURE 1 is a more or less diagrammatic illustration which shows the initial steps in forming a multi-wall bag of the present invention;

FIGURE 2 is a sectional view on an enlarged scale taken on the line 2—2 of FIGURE 1;

FIGURE 3 is a perspective view on an enlarged scale, with portions broken away for purposes of illustration and shows another step in the formation of a multi-wall bag of the present invention;

FIGURE 4 is a fragmentary detail view according to FIGURE 3 and illustrates the completion of the end closure in the formation of a multi-compartment bag of the present invention;

FIGURE 5 is a view similar to FIGURE 1 and illustrates the steps in the formation of a multi-wall vacuum cleaner filter bag of the present invention;

FIGURE 6 is a sectional view on an enlarged scale taken on the line 6—6 of FIGURE 5;

FIGURE 7 is a perspective view which illustrates the formation of the end closures of a vacuum cleaner filter bag of the present invention;

FIGURE 8 illustrates the vacuum cleaner filter bag pursuant to the present invention in position within a vacuum cleaner, portions being broken away for purposes of illustration; and FIGURE 9 is a fragmentary detail view on an enlarged scale and illustrates a vacuum cleaner hose inserted within a vacuum cleaner bag pursuant to the present invention.

Referring now to FIGURES 1 through 4 of the drawings in detail, FIGURE 1 illustrates the formation of a multi-walled or multi-compartmented bag 10 of the present invention. In order to form the bag 10, a continuous web 12 of suitable sheet material, for example a suitable paper material, is advanced in the direction of the arrow 14 from a supply thereof not illustrated. As the web 12 is advanced by conventional bag making machinery from the supply thereof, there is also advanced by conventional bag making machinery a tube 16 preferably formed of similar material to the web 12. The tube 16 is formed on conventional paper bag making machinery and is advanced therefrom in the direction of the arrow 18. The tube 16 is generally of rectangular conformation being provided with the opposing face or side walls 20 and 22 which are inter-connected by the opposing pleated or gussetted end walls 24 and 26. It will be noted that the side wall 22 of the inner bag tube 16 is deposited so as to overlie and abut the upper surface of the web 12 viewing FIGURE 1. A suitable adhesive stripe 28 is provided on the upper surface of the web 12 prior to the deposition of the inner bag tube 16 thereon so as to securely adhere the inner bag tube 16 on the upper surface of the web 12 so as to prevent the relative disengagement of the inner tube and the web 12 during the formation of the multi-walled bag 10. With the continuous inner bag tube 16 deposited on the continuous web 12, a suitable length of the bag tube and the web is severed by conventional paper bag making machinery from the respective supplies thereof. Thereafter, through the utilization of conventional paper bag making machinery the severed portion of the web 12 is folded about the severed portion of the inner tube 16 to provide the multi-tube bag element 30.

As best shown in FIGURE 2, the multi-tube bag element 30 comprises the inner bag tube 16 which is encompassed within the outer bag tube 32. The outer bag tube 32 is provided with the opposing face or side walls 34 and 36 which are interconnected by the opposing pleated or gussetted end walls 38 and 40. It will be noted that the side wall 34 is defined by overlapping longitudinal edge portions of the web 12 which are adhesively seamed together as at 42. The face or side wall 20 of the inner tube member 16 underlies the face wall 34 of the outer tube member 32. The opposing face or side wall 22 of the inner tube member 16 is adhesively secured by means of the adhesive stripe 28 to the opposing face or side wall 36 of the outer tube 32. The gussetted end wall 24 of inner tube 16 is disposed inwardly of the gussetted end wall 38 of the outer tube 32 and the gussetted end wall 26 of the inner tube 16 is disposed inwardly of and adjacent to the gussetted end wall 40 of the outer tube 32. It will be noted, as best shown in FIGURE 2, that the end walls 38 and 40 of the outer tube 32 contain a greater number of gussets or pleats than the end walls of the inner tube 16.

In order to complete the formation of the multi-wall or multi-compartmented bag, the side wall 34 of the outer tube 32 is provided with a plurality of adhesive stripes adjacent one end thereof. As here shown, provision is made for three transverse adhesive stripes 44, 46 and 48 provided on the wall 34 of the outer tube 32 adjacent one end thereof as best shown in FIGURE 1. It will be noted, as best shown in FIGURE 1, that at this point in the formation of the multi-compartmented bag 10 the multi-tube bag element 30 is open at both of the opposing ends 50 and 52 thereof. The three adhesive stripes 44, 46 and 48 are provided adjacent the open end 52. In the next step of the formation of the bag 10, the open end 52 of the multi-tube bag element 30 is folded upon itself, as best shown in FIGURES 3 and 4, to provide a closed and sealed multi-locked end 54. In order to provide the sealed end 54 a fourth adhesive transverse stripe 56 is provided on the outer bag tube 32 and, more specifically, on the outer surface of the side wall 36 thereof adjacent the open end 52, as best shown in FIGURE 3. In forming the triple sealed lock 54 the multi-tube bag element 30 is first folded upon itself at the open end 52 thereof, as illustrated in FIGURE 3, so that the adhesive stripes 46 and 48 thereof are brought into abutment or engagement. Thereafter, a second upfold is formed at the open end 52 of the multi-tube bag element so that the adhesive stripe 56 will abut and engage the adhesive stripe 44 to form the closed triple locked sealed end 54, as shown in FIGURE 4.

In view of the foregoing, it will be noted that the described steps form a bag 10 having an inner compartment which is defined by the inner bag tube 16 which is disposed within or enclosed within an outer compartment defined by the outer bag tube 32. The inner compartment is generally indicated by the reference numeral 58 and the outer compartment is defined generally by the reference numeral 60. It will be apparent that the inner compartment is defined by the four walls which define the inner tube 16 and the outer compartment is defined by the four walls which define the outer tube 32 so that the resulting bag 10 is provided with both a multi-compartmented construction as well as a multi-walled construction. The bag 10 is eminently suitable for storage purposes. In this connection, it will be apparent that different materials or commodities may be stored within the compartments 58 and 60, a material of one type being stored in compartment 58 and a material of a second type being stored in compartment 60. This arrangement is specially useful where the materials are to be used together in some manufacturing process so that the relative percentages of two different materials which are required in a single manufacturing or forming operation may be provided in a single multi-compartmented bag 10. In this connection, it will be noted that, due to the fact that the outer tube 32 has a greater number of gussets in the end walls thereof than is the case in connection with the inner tube 16 as previously described, the outer tube can expand a greater amount or extent than the inner tube so that the greater expansion of the outer tube will compensate both for the expansion of the inner tube within the outer tube, as the inner tube is filled with material consequently, the outer tube can accommodate both the expanded inner tube and the expansion of the outer tube caused by the storage of material therein. If desired, the bag 10 may be utilized for storing materials only within its inner tube 16 and not within its outer tube 32. In this connection, the outer tube serves as a protective device completely encompassing the inner tube so as to add greater protection to the contents of the latter and in essence provide an additional wall for each of the four walls of the inner tube.

The previously described steps are also eminently suitable for use in forming a multi-compartmented or multi-walled vacuum to filter bag 62 shown in FIGURE 8. In forming the vacuum tube filter bag 62 there is provided an endless web 12A of suitable filter sheet material, preferably paper filter material. The web 12A is substantially similar to the web 12 except that the web 12A is provided at intervals spaced longitudinally thereof with the pairs of laterally spaced apertures 64—64. Provision is also made for an inner tube 16A which is similar to the inner tube 16 except that provision is made on the wall 20 thereof, which is provided with a seam 21, for a cross slit 66. It will be noted that the inner tube 16A is provided with a cross slit 66 for each pair of apertures 64 in the web 12A so that when subsequent lengths are cut from the web 12A and the inner tube 16A, there will be a cross slit 66 on each inner tube associated with each pair of apertures 64. The inner tube 16A is secured to the web 12A by the adhesive stripe 28. In the next step in the formation of the vacuum cleaner bag 62, the leading end of the web 12A is severed, as previously described, and wrapped or folded about the severed inner tube 16A by conventional paper bag making machinery to form a multi-tube bag element 30A which is constituted by the inner tube element 16A disposed within the outer tube bag element 32A. As previously described, the outer bag tube element is folded or formed by conventional paper bag making machinery and is provided with the opposing face or side walls 34 and 36 and with the opposing pleated end walls 38 and 40.

As in the multi-tube 30, the construction of the multi-tube 30A is such that the wall 20 of the inner tube 16A underlies the wall 34 of the outer tube and the wall 22 of the inner tube is secured to the inner surface of the opposing wall 36 of the outer tube. Similarly, the gussetted end wall 24 of the inner tube is adjacent the gussetted end wall 38 of the outer tube and the gussetted end wall 26 of the inner tube is adjacent the gussetted end wall 40 of the outer tube, in each case there being a greater number of gussets in the end walls of the outer tube than there are in the end walls of the inner tube. However, it will be noted that when the side wall 34 of the outer tube is defined by folding the web 12A so that the opposing longitudinal ends thereof are secured together along the seam 21, the apertures 64 defined in the outer tube 32A are in registry so as to form a single aperture, in essence, in the wall 34. Further, it will be noted that the apertures 64 are positioned about the slitted portion 66 in the inner tube 16A so as to disclose or reveal the latter, as best shown in FIGURE 5.

Provision is made for a collar 68 having a central aperture 70 which is similar to the apertures 64. The collar 68 is then secured onto the outer surface of the side wall 34 of the outer tube 32A by means of the adhesive material 72 so that the aperture 70 in the collar is in registry with the apertures 64 in said wall 34 whereby the cross slits 66 are exposed through said apertures, as best shown in FIGURES 6 and 7. As best shown in FIGURES 5 and 6, it will be noted that the diameter of the aperture 70 in collar 68 is less than the diameters of the apertures 64 in the wall 34. Consequently, it will be noted from FIGURE 6 that when the collar 68 is secured to the wall 34, a portion 74 of the wall 20 of the inner tube member 16A about the slits 66 thereof is also secured to the collar 68 in view of the fact that said portion 74 is revealed or disclosed by the larger diameter apertures 64. It will be apparent that the multi-tube bag element 30A is provided with an inner compartment 58 and and outer compartment 60 as previously described.

As best shown in FIGURE 8, the vacuum cleaner filter bag 62 is closed at the opposite ends 76 and 78 thereof. For this purpose each of the opposite open ends 50 and 52 is provided with the three adhesive stripes 44, 46 and 48 on the outer surface of the wall 34, as best shown in FIGURE 6, and the opposing wall 36 of the outer tube 32A is also provided adjacent each of the open ends 50 and 52 thereof with an adhesive stripe 56. By means of the adhesive stripes on the walls 34 and 36, each of the open ends 50 and 52 is folded over upon itself to provide the triple lock sealed ends 76 and 78 in the same manner as previously described in connection with the single triple locked closed end of the bag 10.

In utilizing the bag 62, the latter is placed in position within the tank or cannister 80 of a conventional vacuum cleaner. The tank is provided with a conventional aperture 82 about which there is disposed a conventional seal or washer 84 which is interposed between a hose fitting 86 and the tank. An air inlet conduit or hose 89 extends through the fitting 86 and is inserted through collar 68. More specifically, the inner end of the air conduit 89, as best shown in FIGURE 9, extends through the aperture 70 defined in the collar 68 and through the apertures 64 of the outer wall 34 of the outer tube element 32A. Continued movement of the tube into the bag 62 through the collar 68 causes the tube to enter the inner compartment 58 within the inner tube 20 by insertion through the cross slits 66 in the wall 20 of the inner tube 16A so as to spread apart the wings 88 defined by the cross slits 66. Consequently, it will be apparent that dirt laden air brought into the vacuum cleaner through the air intake conduit 89 enters directly into the inner compartment 58 defined by the inner tube element 16A of the vacuum cleaner tube 62. The air passes through the walls of the inner tube 16A into the compartment 60 defined by the outer tube 32A. The air then passes out through the walls of the outer tube 32A. By flowing first through the walls of the inner tube 16A, a first filtration or filter action occurs so as to deposit the great bulk of the dirt or dust drawn by the air into the inner tube within the inner compartment 58 of the bag 62. Any of the dust which passes through th ewalls of the inner tube member 16A is then deposited in the outer compartment 60 as the air passes through the walls of the outer tube member 32A. Therefore, it will be apparent that the vacuum cleaner bag 62 provided for a double filtration action so that substantially all of the dirt, dust and debris which is drawn into the vacuum cleaner bag 62 is deposited in both of the compartments thereof.

I claim:

1. A vacuum cleaner filter bag comprising a first bag tube member, a second bag tube member within which said first bag tube member is disposed and is secured thereto, said first bag tube member having a smaller outer circumference than said second bag tube member resultingly defining multi-compartments thereby, said bag tube members comprising air permeable filter material, said bag tube members being closed at each of the respective ends thereof, cooperating means on said tube members to define an air hose inlet for inserting an air hose through said second tube member into said first tube member, said bag tube members being secured to each other at each end thereof into airtight seals, said air hose inlet comprising opening means defined in a wall of said first bag tube, aperture means defined in a wall of said second tube in a position such that said aperture means overlies said opening means and an apertured collar secured on said wall of said second tube, the aperture of said collar exposing said opening means, the aperture of said aperature means in said wall of said second tube having a larger diameter than the aperture in said collar, said collar being secured through said wall aperture to said first bag tube member.

2. A vacuum cleaner filter bag comprising a first bag tube member, a second bag tube member within which said first bag tube member is disposed and is secured thereto, said first bag tube member having a smaller outer circumference than said second bag tube member, said bag tube members comprising air permeable filter material, said bag tube members being closed at each of the respective ends thereof, cooperating means on said tube member to define an air hose inlet for inserting an air hose through said second tube member into said first tube member, said tubes each having a pair of gusseted end walls, the end walls of said second tube having a greater number of gussets than the end walls of said first tube, said bag tube members being secured to each other at each end thereof into airtight seals, said air hose inlet comprising slit means defined in a wall of said first bag tube, aperture means defined in a wall of said second tube in a position such that said aperture means overlie said slit means, and an apertured collar secured on said wall of said second tube, the aperture of said collar exposing said slit means, the aperture of said aperture means in said wall of said second tube having a larger diameter than the aperture in said collar, said collar being secured through said wall aperture to said first bag tube member, with the result that dirt-laden air entering through said air hose inlet by means of an air hose connected to a vacuum cleaner will enter directly into said first bag tube element, pass through the walls thereof into said second bag tube element and pass out of the walls thereof, further resulting in the deposition of substantial amounts of said dirt into said first bag tube element by successive filtration action between said first and second bag tube members.

References Cited

UNITED STATES PATENTS

| | | | |
|---|---|---|---|
| 1,759,276 | 5/1930 | Replogle | 55—380 X |
| 2,621,757 | 12/1952 | Anderson | 55—376 |
| 2,779,255 | 1/1957 | Clark et al. | 93—8 |
| 2,945,558 | 7/1960 | Cordell | 55—376 |
| 3,173,602 | 3/1965 | Clipner | 229—56 |
| 3,201,027 | 8/1965 | Meyerhoefer | 229—53 |
| 3,291,375 | 12/1966 | Lepisto | 229—55 |
| 3,333,523 | 8/1967 | Terzuoli | 93—8 |
| 2,037,175 | 4/1936 | Northcross | 229—56 |
| 2,099,257 | 11/1937 | Bergstein | 229—14 |
| 2,170,364 | 8/1939 | Bergstein | 229—14 |
| 2,177,918 | 10/1939 | Vogt et al. | 299—14 X |
| 2,432,053 | 12/1947 | Waters. | |
| 2,617,576 | 11/1952 | Bergstein | 229—14 |
| 2,649,925 | 8/1953 | Tschudy | 55—375 X |
| 2,758,520 | 8/1956 | Hepworth. | |
| 2,804,166 | 8/1957 | Stevens et al. | 55—382 X |
| 2,829,734 | 4/1958 | Brace | 55—375 X |
| 2,975,862 | 3/1961 | Goldberg | 55—381 X |
| 3,094,083 | 6/1963 | Weeks | 93—35 X |
| 3,107,989 | 10/1963 | Fesco | 229—53 X |
| 3,252,274 | 5/1966 | Beason et al. | 55—382 X |

FOREIGN PATENTS

| | | |
|---|---|---|
| 954,996 | 4/1964 | Great Britain. |
| 105,543 | 9/1942 | Sweden. |

FRANK W. LUTTER, Primary Examiner

D. E. TALBERT, JR., Assistant Examiner

U.S. Cl. X.R.

55—377, 378, 381; 93—8, 35; 150—1; 156—236, 324; 229—62.5, 56; 285—7